Aug. 20, 1957  R. E. SKOW  2,803,590
APPARATUS FOR DISTILLING LIQUIDS
Filed Dec. 20, 1950  8 Sheets-Sheet 1
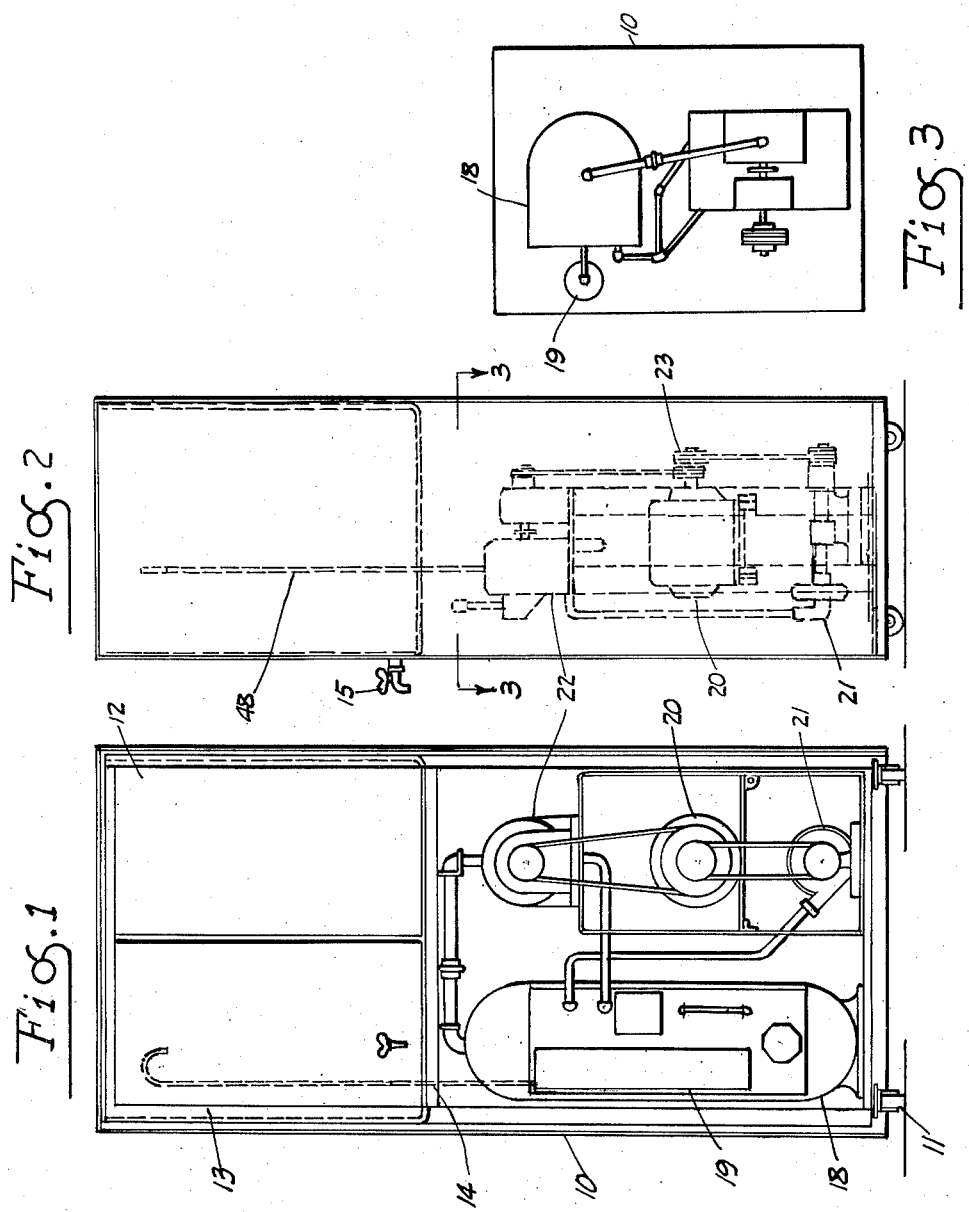
INVENTOR.
Ross E. Skow
By Salvatore G. Militana
Attorney INVENTOR.
Ross E. Skow
By Salvatore G. Militana
Attorney Aug. 20, 1957     R. E. SKOW     2,803,590
APPARATUS FOR DISTILLING LIQUIDS
Filed Dec. 20, 1950     8 Sheets-Sheet 5

INVENTOR.
Ross E. Skow
BY Salvatore G. Militana
Attorney

Aug. 20, 1957 R. E. SKOW 2,803,590
APPARATUS FOR DISTILLING LIQUIDS
Filed Dec. 20, 1950 8 Sheets-Sheet 6

INVENTOR.
Ross E. Skow
BY Salvatore G. Militana
Attorney

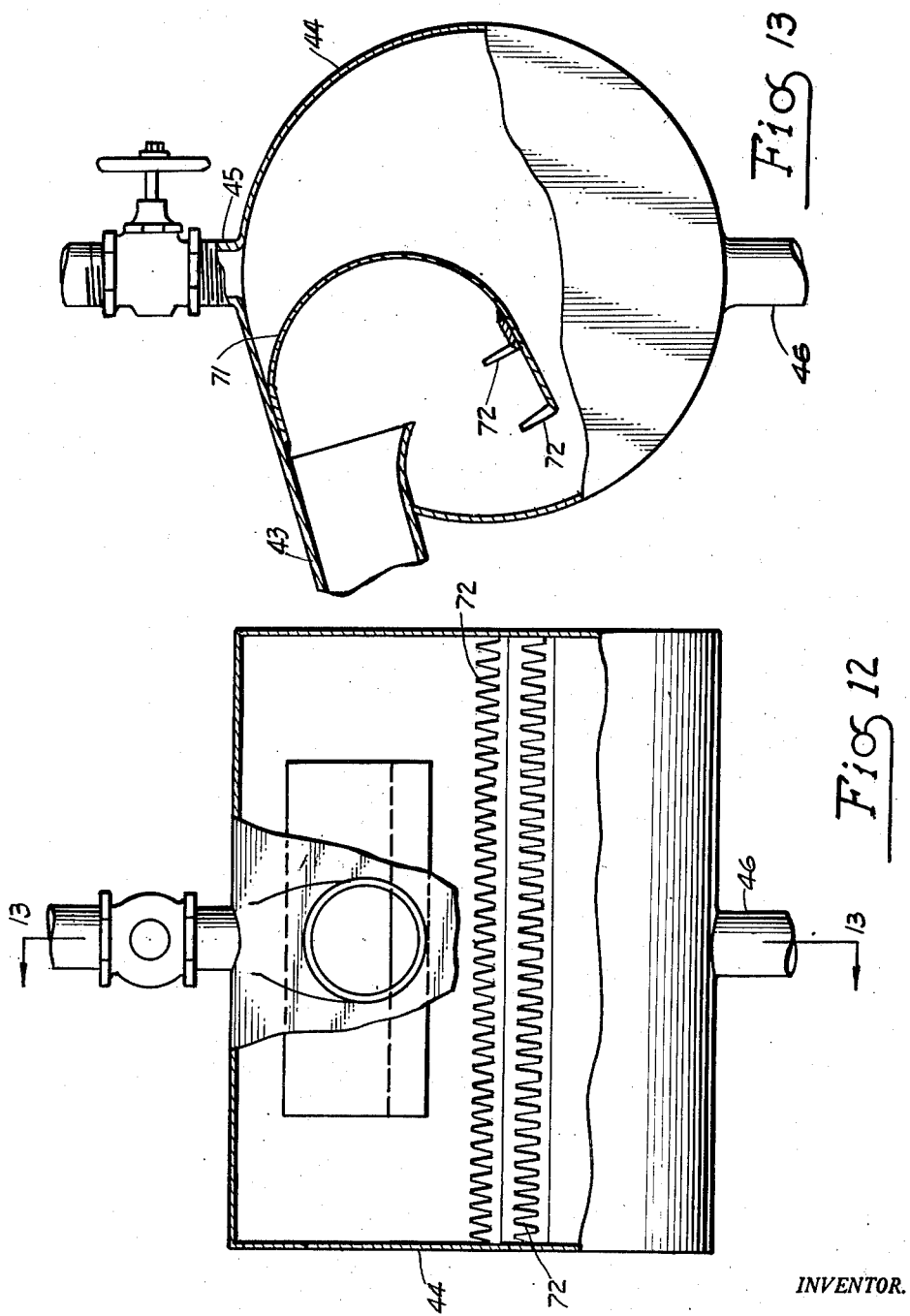

Aug. 20, 1957     R. E. SKOW     2,803,590
APPARATUS FOR DISTILLING LIQUIDS
Filed Dec. 20, 1950     8 Sheets-Sheet 8

INVENTOR.
Ross E. Skow
By Salvatore G. Militana
Attorney

United States Patent Office 2,803,590
Patented Aug. 20, 1957

2,803,590

APPARATUS FOR DISTILLING LIQUIDS

Ross E. Skow, Kansas City, Mo., assignor, by mesne assignments, to Hydro Engineering Corporation, Miami, Fla., a corporation of Florida Application December 20, 1950, Serial No. 201,833

2 Claims. (Cl. 202—232)

This invention relates to improvements in the process and apparatus for distilling liquids and has for a principal object to provide a mechanism of that character in which the liquids having any quantity or specie of impurity may be distilled to any predetermined degree of purity whether it be for industrial, commercial, or scientific purposes.

Another object of the present invention is to provide a liquid distilling process and apparatus which is so designed to be completely automatic in operation so that upon commencing the operation of the system the attendance of any person to supervise same is not required.

Another object of the present invention is to provide a process and apparatus for the distillation of liquids in which the heat loss in the system is negligible, making the device most efficient in operation and consequently reducing the cost of producing distilled liquids to an extreme minimum.

A further object of the present invention is to provide a process and apparatus for purifying water which may be embodied in any sized system ranging from a small compact unit for house hold purposes or to as large as a system as would be necessary to provide pure water for an entire city.

A further object of the present invention is to provide a process and apparatus for distilling liquids wherein the raw water is caused to be distilled in a partial vacuum rather than in atmospheric or higher pressures, thereby resulting in an economy of heat requirements demanded by the apparatus to operate properly.

A further object of the present invention is to provide a process and apparatus for purifying water and distilling other liquids wherein a vacuum pressure pump creates a partial vacuum in the regenerator during the evaporation of the water, and returns the vapors to coils in the regenerator under pressure with an increased heat content which is given off to the raw water being vaporized thereby reducing to almost zero the requirement for an external source of heat.

A still further object of the present invention is to provide a process and apparatus for purifying water wherein a vapor-liquid separator is utilized which removes completely from the vapors produced in the regenerator every trace and particle of moisture prior to the vapors being discharged therefrom.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

In the drawings:

Figure 1 is a front elevational view of a water purifying device made in accordance with my invention with the casing removed to show the general arrangement of the parts thereof.

Figure 2 is a side elevational view.

Figure 3 is a sectional view taken thru 3—3 of Fig. 2.

Figure 12 is a front view in elevation partially broken away of the deaerator.

Figure 13 is a partial sectional view taken thru 13—13 of Fig. 12.

Figure 4:
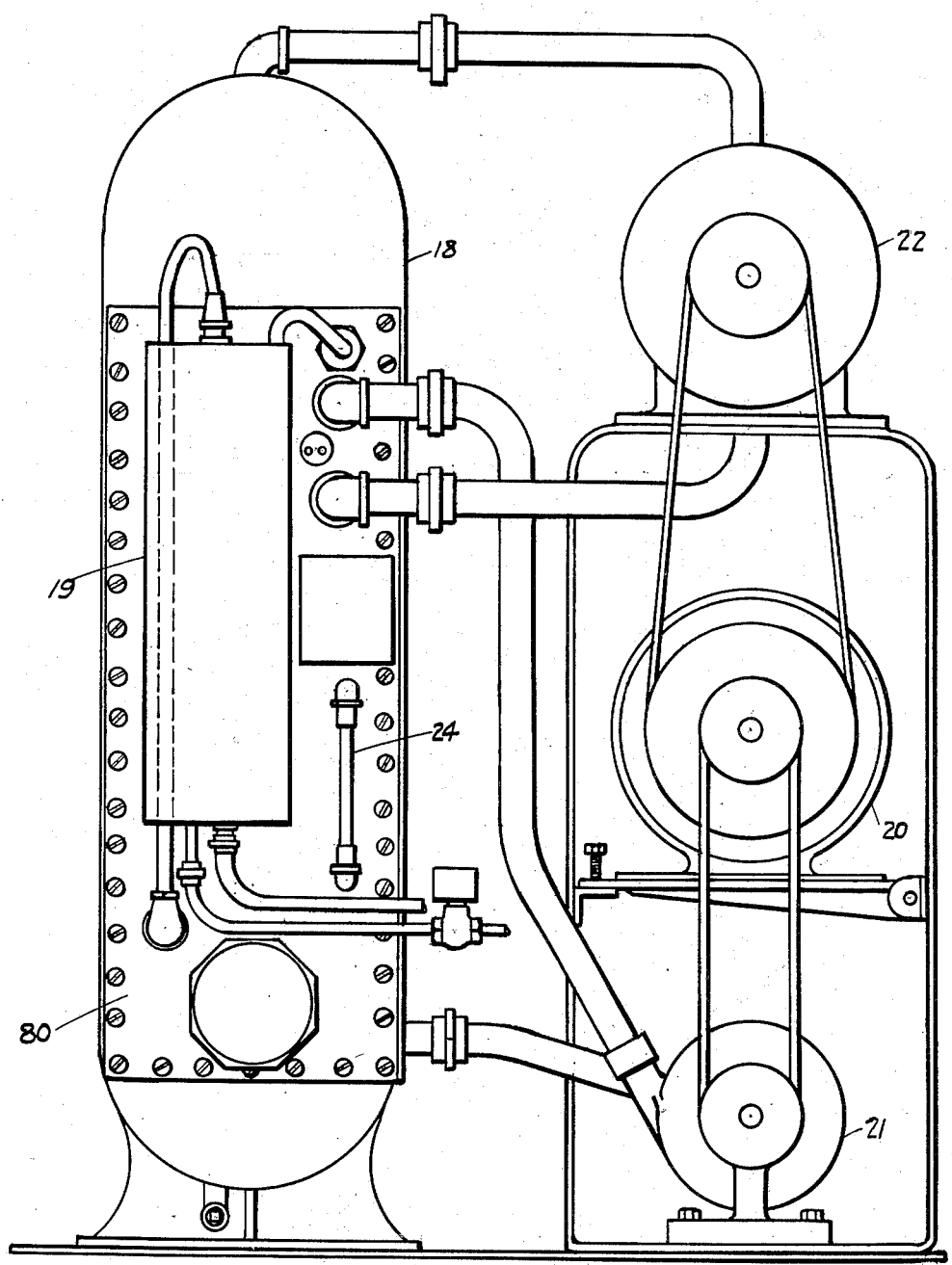
Figure 4 is an enlarged view in elevation of the working parts shown in the lower portion of Fig. 1.

Referring now to the drawings wherein like numerals designate corresponding parts in all the figures, the numeral 10 in Figs. 1–3 inclusive refers to a cabinet mounted on wheels 11 to form a portable compact unit within which is housed the complete working parts utilized in the water purifying system embodying the present invention. It is to be understood, however, that the arrangement of parts in the system as hereinafter described is merely one preferred to best show and describe the instant invention, but that any arrangement of the parts making up the system may be utilized ranging from small, portable compact units as shown, or tremendous water purifying plants furnishing pure water for the needs of a city. The unit contained by the cabinet 10 has a raw water storage tank 12 and a pure water storage tank 13 in the upper half thereof supported on a shelf 14. The tanks 12 and 13 are interconnected in a manner which will be hereinafter explained in detail, with the working mechanism of the device contained in the lower half of the cabinet 10. The pure water tank 13 is provided with a spigot 15 from which drinking water may be procured, and though the drawings fail to show any refrigerating apparatus for cooling the water, it is to be understood that such apparatus may be provided as desired.

Figure 5:
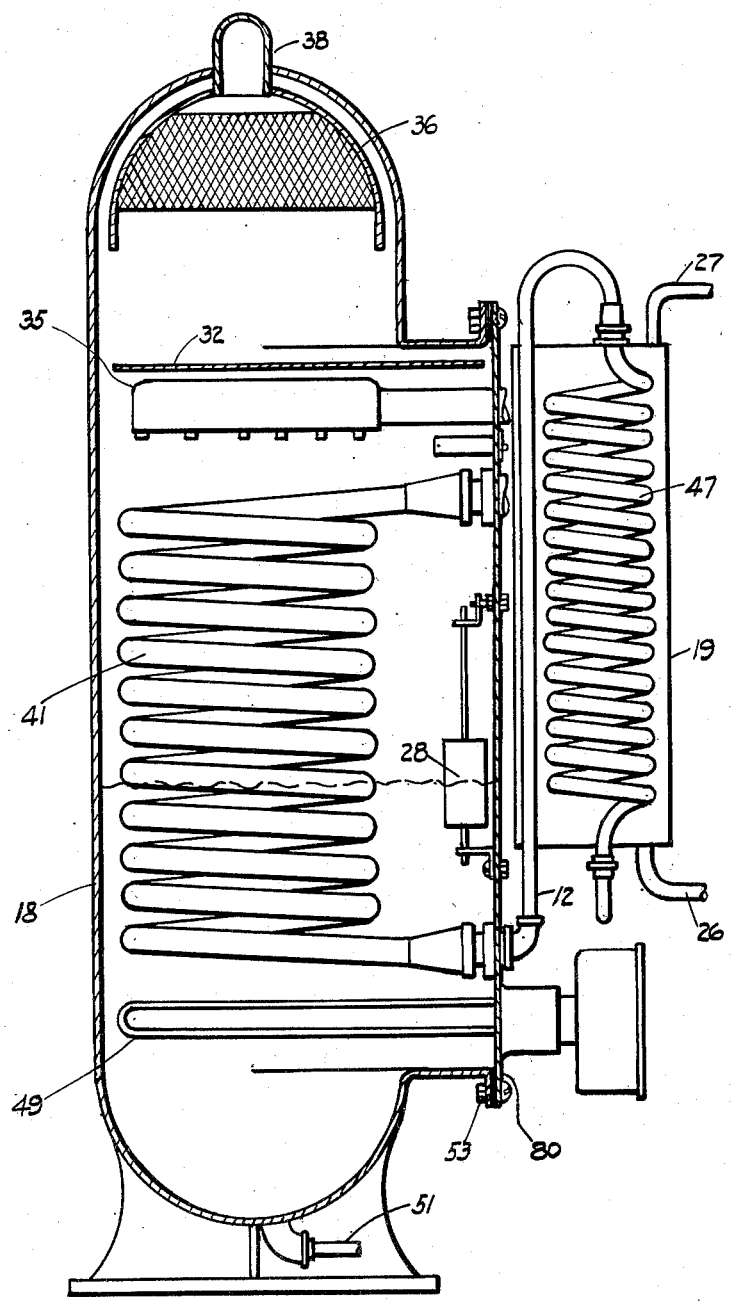
Figure 5 is a sectional view in elevation of the regenerator and the heat exchange apparatus.

In general the major mechanisms of the water purifying system consists of a regenerator 18, a heat exchanger 19, and a motor 20 interconnected with a water pump 21 and a vacuum-pressure pump 22 by means of a conventional arrangement of pulleys and belts generally designated by the numeral 23. Referring now to Figures 4 and 5 which show the aforementioned mechanism in enlarged and detailed views, and to Figure 6 which shows schematically the arrangement of the various parts that make up the system, the raw water tank 12 is connected to a source of water not shown, but which nevertheless maintains water in the tank 12 at a predetermined level at all times. A float 16 is connected to a micro-switch mechanism 75 in an electrical wiring best shown in the diagram of Figure 14, as a safety measure to stop the operation of the system in the event the water level within the tank 12 falls below a predetermined level.

Figure 6:
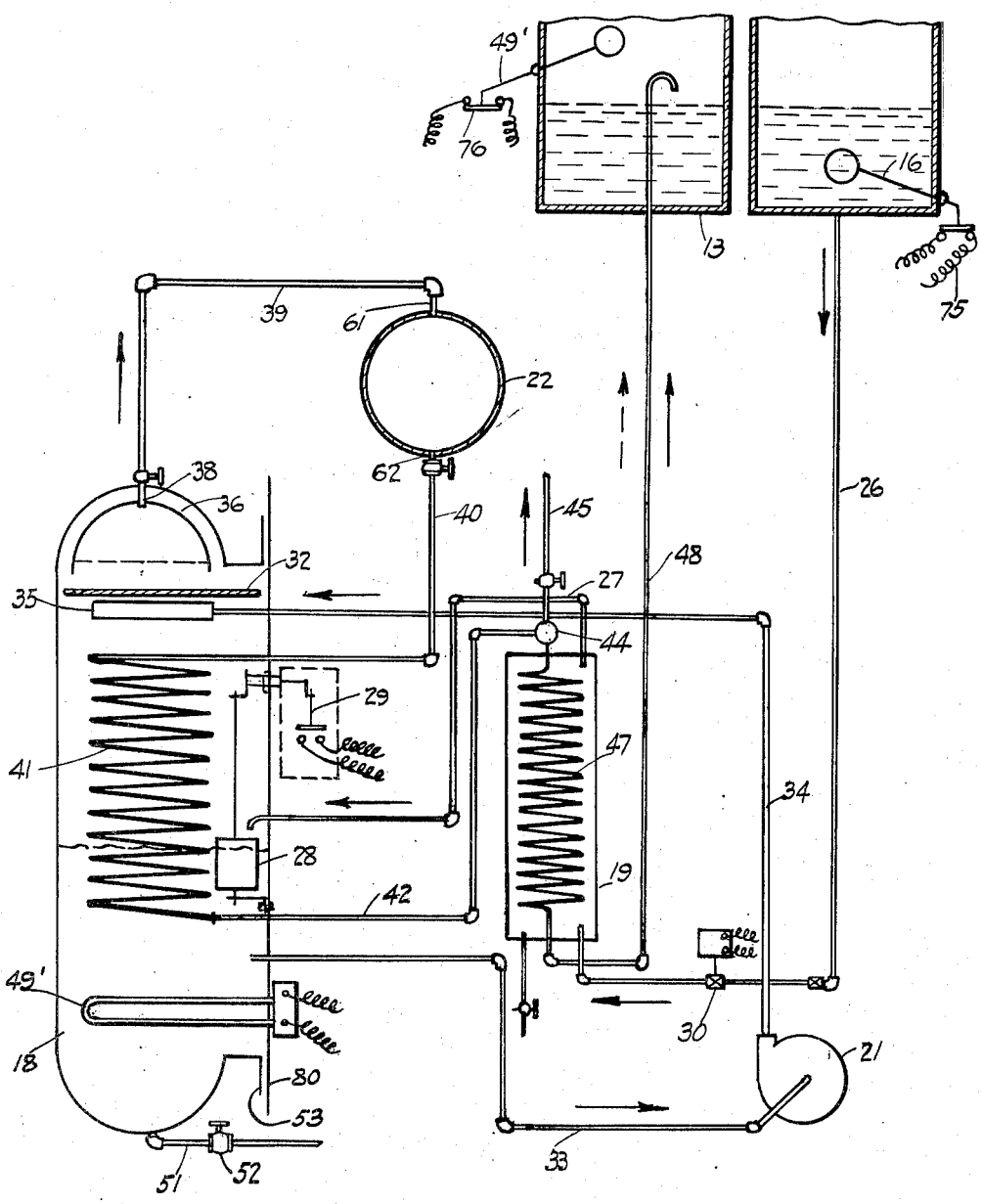
Figure 6 is a schematic diagram of the water purifying system embodying my invention.

A pipe line 26 connects the tank 12 with the heat exchanger 19 at the bottom portion thereof, the top portion being connected by a pipe line 27 which extends to the regenerator 18, which construction is best shown by Fig. 6. A float valve 28 mounted within the regenerator 18 maintains a desired liquid level therein by the actuation of a micro-switch 29 which operates a solenoid operated valve 30 in the pipe line 26. (See Fig. 14.) A water pump 21 has its intake connected to a pipe line 33 which communicates with the lower portion of the regenerator 18 below the liquid level line therein, and the outlet thereof connected to a pipe line 34 which extends to a spray head 35 mounted in the upper portion of the regenerator 18. Within the top most portion of the regenerator 18 there is contained a moisture-vapor separator 36 having its inlet 37 of cross-sectional area substantially equal to that of the regenerator 18 and is in communication therewith. Between the separator 36 and the spray head 35 there is a combination drip pan and baffle plate 32 horizontally mounted by clips (not shown) on the inside walls of the regenerator 18 and spaced therefrom as shown. The purpose of this plate 32 is to catch the liquid droplets dropping from the separator 36, and also to provide the upward flowing vapors with a change in direction as they flow along the baffle plate 32 and past the marginal portion thereof to rid the vapors of the larger droplets entrapped by the vapors.

The outlet 38 of the separator 36 is connected to a pipe line 39 which communicates with the intake 61 of a vacuum-pressure pump 22 (explained in detail hereinafter) whose outlet 62 is connected to a pipe line 40. A vertically arranged copper coil 41 is mounted within the regenerator 18 having its inlet at the top portion thereof connected to the pipe line 40 and its outlet connected to a pipe line 42 which is connected at its other end to an inlet 43 of a deaerator 44 shown in detail by Figs. 12 and 13. An outlet 45 of the deaerator 44 permits the escape of the free oxygen and other gases, while the outlet 46 is connected to a coil 47 mounted within the heat exchanger 19. The outlet end of the coil 47 is connected to a pipe line 48 which communicates with the pure water tank 13. A float 49 mounted within the tank 13 energizes the system through a micro-switch 76 and the wiring arrangement as shown (see Fig. 14) when the water level therein falls below a predetermined level and cuts the system off when the tank 13 is filled with pure water. In the lower portion of the regenerator 18 there is a heating element 49 controlled by a thermostat 50 as shown by the wiring diagram in Fig. 14. Except for the separator 36, all of the mechanisms contained in the regenerator 18 are mounted on a side plate 80 which is secured to a flanged portion 53 of the regenerator so that the aforementioned parts can be removed or made readily accessible in the event of the need for repairs or replacement of parts thereof. A liquid level sight glass 24 is mounted on the plate 80 to permit a visual indication of the water level in the regenerator 18. In order to remove the sludge or other impurities that have accumulated in the bottom portion of the regenerator 18, a drain line 51 is provided with a valve 52 mounted on the line 51 to control the flow therethrough.

Figure 7:
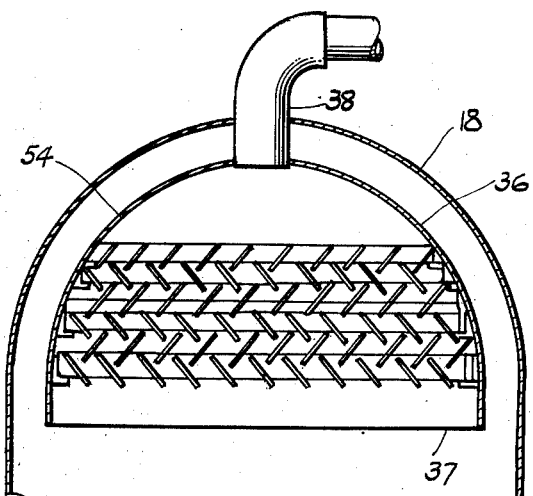
Figure 7 is a sectional view in elevation of the moisture-vapor separator.
Figure 8:
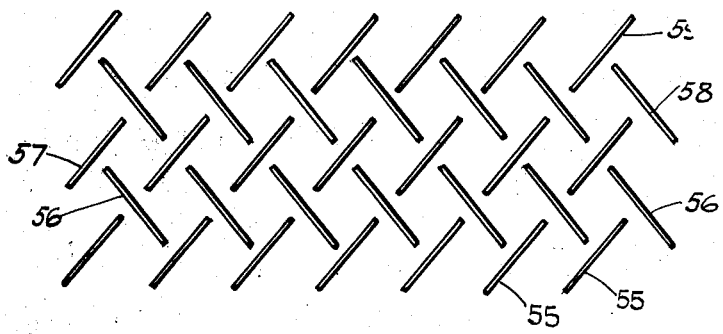
Figure 8 is an enlarged view of the baffle plates of the separator shown in Fig. 7.

Referring now to Figs. 7 and 8, the moisture-vapor separator 36 consists of a dome like shell 54 within which are mounted a plurality of baffle plates arranged in horizontally disposed tiers; the lower tier consisting of the baffle plates 55 set in parallel relation to each other, a second tier consisting of the baffle plates 56 parallel to each other arranged above and spaced from the first tier of baffle plates 55 at an angle thereto approximately equal to 100 degrees as shown. Both tiers of baffle plates 55 and 56 are so positioned relative to each other that if the first tier of baffle plates 55 were extended, they would strike the second tier of baffle plates 56 at approximately the mid-portion thereof. All further tiers of baffle plates 57, 58 and 59 are positioned in the same manner relative to the tier of baffles below as the tier of baffle plates 56 bears toward that of baffle plates 55. In this manner the vapor passing through the separator is provided a tortuous path causing the vapor, as it passes along one baffle plate, to impinge against the upper baffle plates, thus relieving the vapor of any moisture entrained therein. The moisture that form droplets then flows down the baffle plates and back into the regenerator chamber 18 to be vaporized anew. Consequently only the vapors with all of the moisture particles removed therefrom will flow thru the outlet 38 of the separator and into the vacuum-pressure pump 22.

Figures 10, 11:
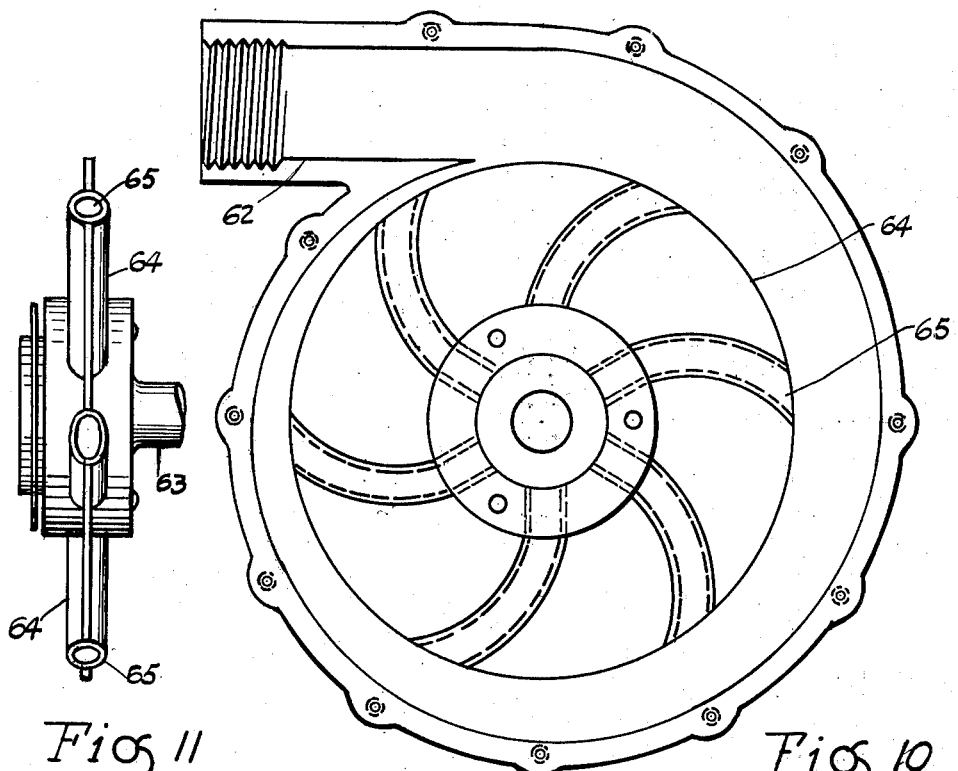
Figure 10 is a sectional view taken thru 10—10 of Fig. 9.
Figure 11 is a side elevational view of the impeller plate, as seen removed from the vacuum-pressure pump casing.
Figure 9:
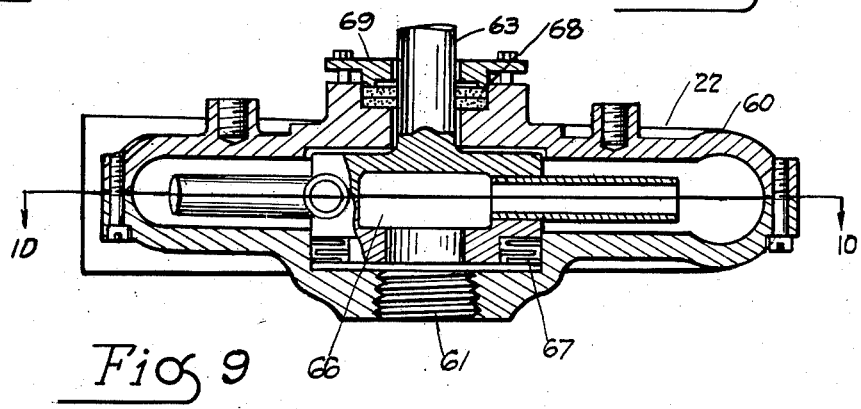
Figure 9 is a cross sectional view taken thru the axis of rotation of the turbine type combination vacuum-pressure pump.

The pump 22, by virtue of its particular construction as is hereinafter explained, is capable of creating a vacuum of approximately from 3 to 5 inches at its inlet port 61 and discharging the vapors under a pressure of approximately sixteen pounds absolute at its discharge port 62. (See Figs. 9–11 inclusive.) The vacuum-pressure pump 22 is of the turbine type consisting of a disc shaped housing 60 in which a shaft 63 and an impeller plate 64, to which the former is secured, are rotatably mounted. The impeller plate 64 has a plurality of arcuate fluid passages 65 therein communicating at one end with a centrally positioned cavity 66 and opened at their outer ends so as to permit the flow of fluid from the centrally positioned inlet 61 to the tangential outlet port 62. It is to be noted that the periphery of the casing 60 comprises a series of arcs of circles of increasing radii starting from a position adjacent the outlet port 62 and moving in a counter clock-wise direction to the throat of the outlet port 62. This construction results in a uniform increasing clearance between the impeller plate 64 and the housing 60 which is smallest at the position adjacent to the outlet port 60 and largest at point of discharge at the port 62. Labyrinth packings 67 mounted between the hub of the impeller 64 and the housing 60 and the packing material 68 mounted about the shaft 63 and pressed by the packing plate 69 against the housing 60 prevents any leakages that would give rise to an inefficient operation of the pump 22.

Since all free oxygen and other gases must be removed from the distilled vapors after leaving the coils 41 in the regenerator 18 and before being stored as water of high degree of purity, it is piped into the cylindrical shaped deaerator 44 at the inlet 43 where the vapor is compelled to follow a semi-circular path by the arcuate baffle plate 71 and to impinge on a pair of rows of upwardly extending projections or fingers 72 causing the vapors to break down releasing any free oxygen and other gases entrained therein. The water vapors themselves will then flow downwardly to the outlet 46 while the lighter oxygen vapors and other gases will rise and escape thru the outlet 45 to the atmosphere.

Figure 14:
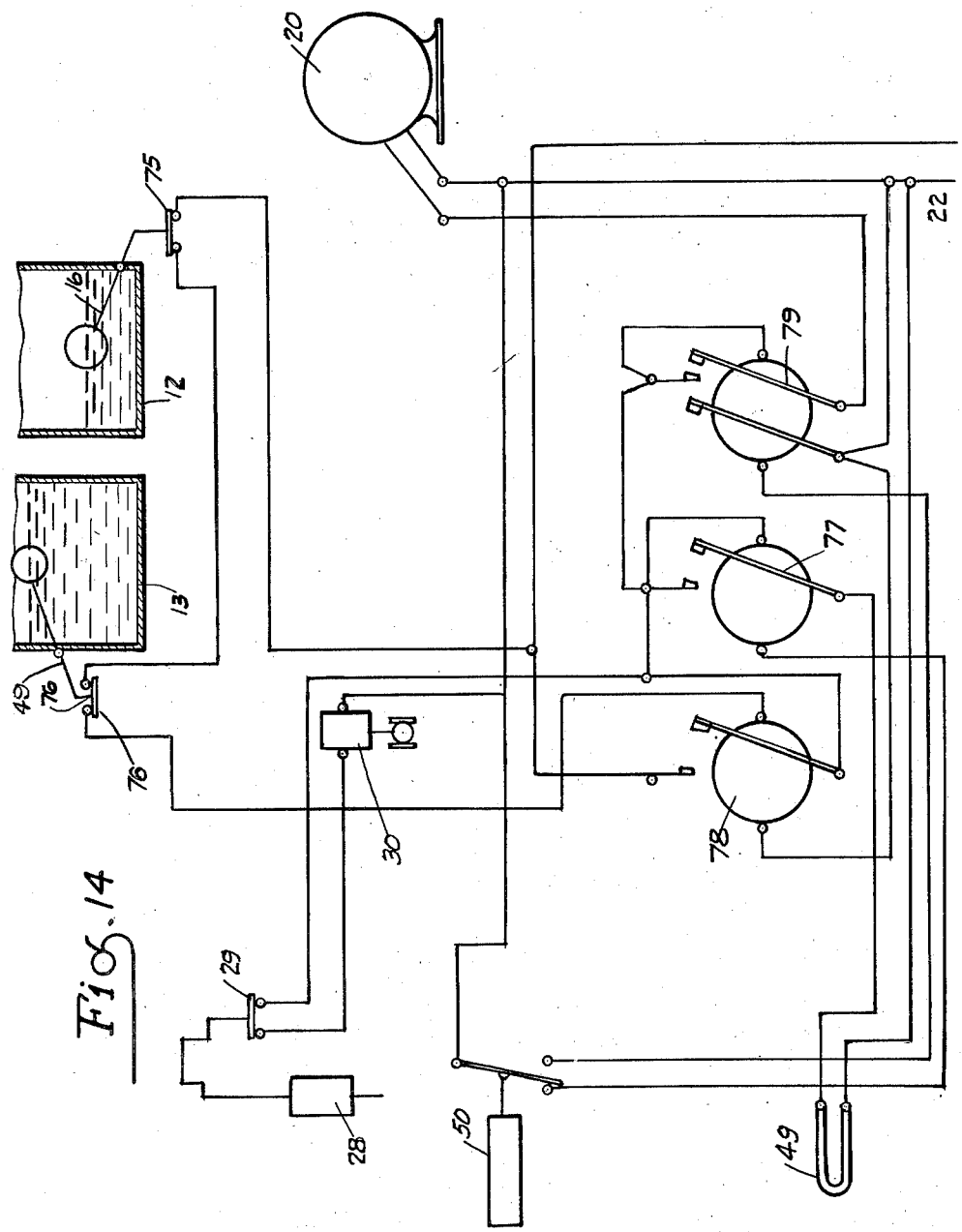
Figure 14 is a wiring diagram of the water purifying system showing the various automatic controls contained therein.

In the normal operation of the device, the raw water contained in the tank 12 will flow thru the pipe line 26 past the solenoid operated valve 30 and into the heat exchanger 19 (see Figs. 6 and 14). In the event the tank 12 becomes empty, the float 16 will open the micro-switch 75 and cause the complete system to be deenergized thru the contactor 78 until water in the tank 12 is replenished. In the heat exchanger 19, the raw water is preheated by the hot water vapor passing through the coils 47 of the heat exchanger on its way to being discharged into the pure water tank 13. The raw preheated water then flows from the top of the heat exchanger 19 to the regenerator 18 to maintain a constant level therein. If the level of water in the regenerator 18 goes beyond a certain desired level the float 28 will cause the micro-switch 29 to open the circuit and deenergize the solenoid valve 30 to its closed position and stop the flow of water from the raw water tank 12. When the water level in the regenerator 18 drops below a certain level, the float valve 28 will cause the micro-switch 29 to close the electrical circuit, energize the solenoid of the valve 30 and open the line to permit the raw water to now flow from the tank 12 to the heat exchanger 19.

The heating element 49 is utilized to assure the maintenance of a desired temperature of water therein with the thermostat 50 through the contactor 77 to cut on and off the electrical energy to the heating element 49 as the water temperature falls below or remains within the predetermined temperature limits, respectively. Should the water in the regenerator 18 get hotter than the setting on the thermostat 50, the system will be de-energized thru the contactor 79 and the motor 20 will stop until the temperature of the water drops. In actual practice under normal prevailing conditions, the heating element 49 is utilized only at the start of the operation of the device, inasmuch as after the water in the regenerator is once brought to the predetermined temperature which is approximately 212 degrees F., the heat produced by the vacuum-pressure pump 22 is sufficient to provide for the necessary vaporization of the raw water within the regenerator 18 and to also compensate for heat losses normal to such devices as the instant invention notwithstanding the conventional insulation used to reduce heat losses to a minimum.

The water pump 21 now pumps the raw heated water from the bottom portion of the regenerator 18 to the spray head 35 in the top portion therein to spray the water onto the coils 41. As was explained above, the vacuum pressure pump 22 creates a partial vacuum in the regenerator 18 withdrawing vapor there-from under the vacuum created while discharging the vapors to the coils 41 in a compressed state. It is general knowledge that the temperature of vaporization of water is less than 212 degrees F. at pressures less than atmospheric, and that vapors placed under pressure rise in temperature in accordance to the amount of work done on the vapors by the pump. Therefore, as the sprayed water impinges on the coils 41, heat is absorbed therefrom sufficiently to vaporize said water. As the vapors pass along the baffle plates of the vapor-moisture separator 36, any droplets of water entrained in the vapors are caused to drip back into the regenerator 18 as the vapors continue on and flow through the pipe line 39 to the intake 61 of the pump 22, the cavity 66, and the impeller blade passages 65 to be compressed and discharged under approximately sixteen pounds pressure absolute and 218 degrees F. in temperature at the outlet 62. The vapor under pressure then flows through the pipe line 40 to the coils 41 where a portion of its latent heat is given up to the raw water that is sprayed thereon, as has been previously explained. Upon giving off its latent heat, the vapors under pressure continues downwardly to the lower extremity of the coil 41 and is discharged through the pipe line 42 to the inlet 44 of the deaerator 43 where the free oxygen and other gases are caused to be separated, the gases being discharged to the atmosphere through the outlet 45 while the purified vapors flow thru the outlet 46 and into the coils 47 of the heat exchanger 19. There the purified vapor gives off its remaining heat to the raw water flowing within the heat exchanger 19 on its way to become purified so that by the time the purified water is about to leave the heat exchanger, which is at the point of entry of the raw water, it will have given off a major portion of its heat to the raw water.

The purified water then flows through the pipe 48 and is discharged into the storage tank 13, where it is ready for use. The apparatus continues to operate until the tank 13 becomes filled with pure water at which time the float 49' will rise and cause the micro-switch 76 to open the circuit and stop the operation of system. When the level of pure water in the tank 13 falls below a predetermined level, the float 49' will cause the micro-switch 76 to close the circuit and start the operation of the water purifying system until such time as the tank is filled with pure water again. In order to prevent the contamination of the water in the system after it has been purified, the inner surfaces of regenerator, pipe lines, pump and deaerator are block tinned.

Having now disclosed my invention and realizing that, in view of my disclosure many modifications in details of construction or design will readily occur to those skilled in the art, I do not choose to limit myself except as in the appended claims.

What I claim as new is:

1. An article of manufacture comprising a tank, a stand secured to the lower portion of said tank, an opening in the side wall of said tank, said opening having a circumferential flanged portion, a panel, means securing said panel to said flanged portion to form a leak proof chamber in said tank, a spray head mounted at the top portion of said panel and extending into said tank, a vertically disposed coil pipe contained in said tank below said spray head and having its ends secured to said panel, float means mounted on said panel for maintaining a predetermined liquid level in said tank, said lower end of said coil pipe extending below said predetermined liquid level, and a heating element mounted at the lower portion of said panel and extending in said tank.

2. The structure as recited in claim 1 including a vapor-moisture separator mounted in the top most portion of said tank, a baffle plate extending horizontally within the tank positioned between said separator and said spray head and secured to the top portion of said panel, and drain means secured to the lower portion of said tank.

References Cited in the file of this patent

UNITED STATES PATENTS

| | | |
|---|---|---|
| 1,150,713 | Soderlund | Aug. 17, 1915 |
| 1,200,996 | Soderlund et al. | Oct. 10, 1916 |
| 1,803,381 | Davy | May 5, 1931 |
| 2,185,595 | Kleinschmidt | Jan. 2, 1940 |
| 2,201,961 | Stolz | May 21, 1940 |
| 2,235,892 | Kuhner | Mar. 25, 1941 |
| 2,411,816 | Teague | Nov. 26, 1946 |
| 2,441,361 | Kirgan | May 11, 1948 |
| 2,465,625 | Aue | Mar. 29, 1949 |
| 2,487,884 | Lunt | Nov. 15, 1949 |
| 2,537,259 | Cleaver et al. | Jan. 9, 1951 |
| 2,589,406 | Latham | Mar. 18, 1952 |
| 2,649,408 | Williamson et al. | Aug. 18, 1953 |

FOREIGN PATENTS

| | | |
|---|---|---|
| 512,657 | Great Britain | Sept. 22, 1939 |